United States Patent [19]
Nagae

[11] 3,737,665
[45] June 5, 1973

[54] METHOD AND APPARATUS FOR AUTOMATICALLY DETECTING DEFECTS AND IRREGULARITIES IN GLASS SHEET

[75] Inventor: Yasuyuki Nagae, Sakai-shi, Osaka, Japan

[73] Assignee: Central Glass Company, Limited, Yamaguchi-ken, Japan

[22] Filed: Oct. 20, 1971

[21] Appl. No.: 191,030

[52] U.S. Cl. .......................... 250/219 DF, 356/239
[51] Int. Cl. ............................................. G01h 21/32
[58] Field of Search ................. 250/219 DF, 219 Th, 250/222 R; 356/209–212, 203, 161, 239, 237

[56] References Cited
UNITED STATES PATENTS

| | | | |
|---|---|---|---|
| 3,199,401 | 8/1965 | Sleighter et al. | 250/219 DF X |
| 3,510,664 | 5/1970 | Nichols | 345/209 X |
| 3,524,988 | 8/1970 | Gaither | 250/219 DF |
| 3,612,702 | 10/1971 | Troll | 250/219 DF X |
| 3,188,478 | 6/1965 | Binks | 250/219 DF |
| 2,993,402 | 7/1961 | Dunipale et al. | 250/219 TH X |
| 3,174,046 | 3/1965 | Lindemann et al. | 250/219 DF |

*Primary Examiner*—Walter Stolwein
*Attorney*—Joseph M. Lane, Richard L. Aitken, Donald R. Dunner

[57] ABSTRACT

Method for automatically detecting defects and irregularities contained in or on the surface of glass sheet. The method includes scanning laser beams on the glass sheet and with a laser detector, detecting the presence of defects by measuring the decrease of light input reaching the laser detector as a result of dispersion of the laser beam by the defects. Apparatus for carrying out method.

22 Claims, 7 Drawing Figures

PATENTED JUN 5 1973 3,737,665

INVENTOR.
YASUYUKI NAGAE

METHOD AND APPARATUS FOR AUTOMATICALLY DETECTING DEFECTS AND IRREGULARITIES IN GLASS SHEET

BACKGROUND OF THE INVENTION

The field of this invention relates to a method and apparatus for automatically detecting defects and irregularities contained in sheet glass, such as small pieces of undissolved solids, ceramic materials, bubbles, surface scores and scratches.

Defects and irregularities contained within or on the surface of sheet glass deteriorate the quality of the sheet glass. Such defects and irregularities give rise to many problems in the manufacture of sheet glass. For example, in some instances, the sheet glass is manufactured by molding molten glass in a glass melting furnace and is removed from the furnace with the molten glass containing impurities. These impurities result from the starting materials of the glass or from undissolved pieces of bricks or ceramics which are eroded from the furnace walls during melting. When the sheet glass is taken up and held between take-up rolls, the presecne of such defects and irregularities produces cracks or fissures in the surface of the sheet glass, which rapidly grow larger due to the heat distortion to which the sheet glass is subjected. As a result, the sheet glass may crack and shatter during the transfer operation.

A method which has been utilized to overcome this problem is to visually examine the sheet glass before the glass reaches the first take-up rolls for defects or irregularities and allow the rolls to widen and release the glass so as to pass over the defects and irregularities as they are noticed. This method, however, requires continuous and complete supervision of sheet surface throughout the entire surface thereof in order to detect the defects and irregularities, which in some cases are as small as 0.5 mm to 1.0 mm. Such inspection is extremely tedious and susceptible to error.

To automatically detect the defects contained in transparent sheet glass, a method has been used which includes irradiating ordinary light beams on the sheet glass to detect the presence of defects and irregularities by measuring the weakening influence of such defects or irregularities on the light beam. However, ordinary light rays cannot be generated in a narrow beam and comprise light of various wavelengths. As a result, light beams which obliquely enter the sheet glass tend to expand or disperse when passing through the sheet glass or are reflected by the glass sheet. Therefore, the detection of small defects with ordinary light is difficult.

SUMMARY OF THE INVENTION

The detection apparatus of the present invention includes a laser generator for generating laser beams for automatically detecting defects, such as small pieces of broken brick or ceramics, bubbles and surface cracks contained in the sheet glass.

The method of operation includes scanning these laser beams over the surface of glass. Since a narrow and parallel or collimated beam of single wavelength light energy is obtained from a laser generator, its use will provide beams which will not expand when encountering varying indexes of refraction as they pass across the sheet glass, enabling detection of extremely fine defects and irregularities. Since there is no spreading of the beam even when passing through glass with varying indices of refraction, beams oblique to the glass sheet can detect small defects. Furthermore, since the laser generator produces narrow, collimated light of high intensity, the apparatus can be made small in size relative to the ordinary light type apparatus.

Accordingly, it is an object of the present invention to provide a method for automatically detecting the defects and irregularities contained in or on the surface of sheet without visual inspection.

Another object of the invention is to provide a method for automatically detecting the defects and irregularities contained in or on the surface of sheet glass which can detect defects and irregularities smaller than those capable of visual detection.

Still another object of the invention is to provide a method of automatically detecting defects contained in sheet glass throughout the width of a large glass sheet.

A further object of the invention is to provide a method of automatically detecting defects in sheet glass and indicating the transverse location of the defects in the longitudinal sheet glass.

Another object of the invention is to provide a novel apparatus for detecting defects in sheet glass.

DESCRIPTION OF THE PREFERRED EMBODIMENTS

Figure 1:
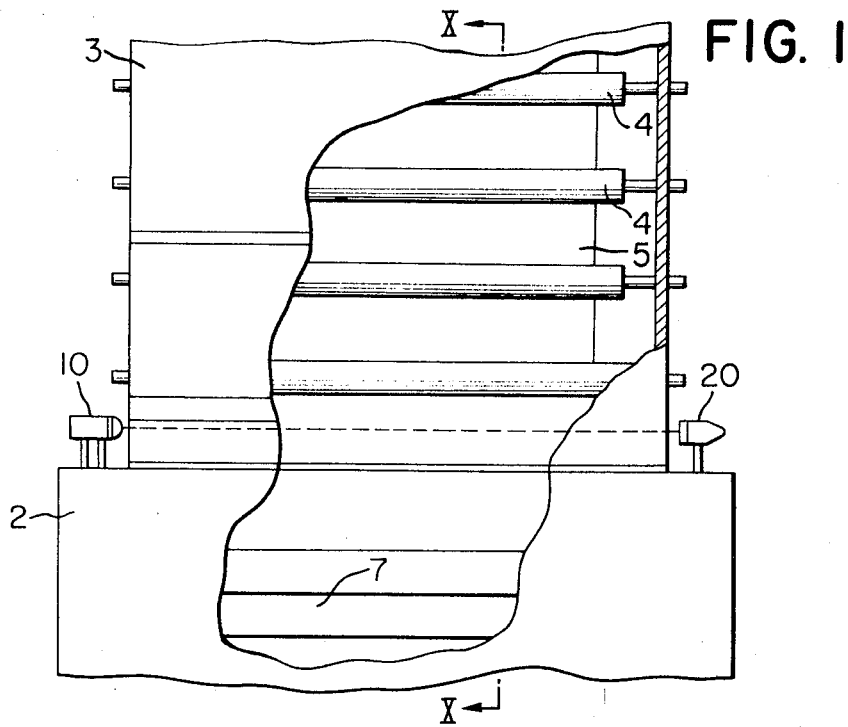
FIG. 1 is a partially cutaway front elevation view of an apparatus for the manufacture of sheet glass including the detection apparatus of the present invention.
Figure 2:
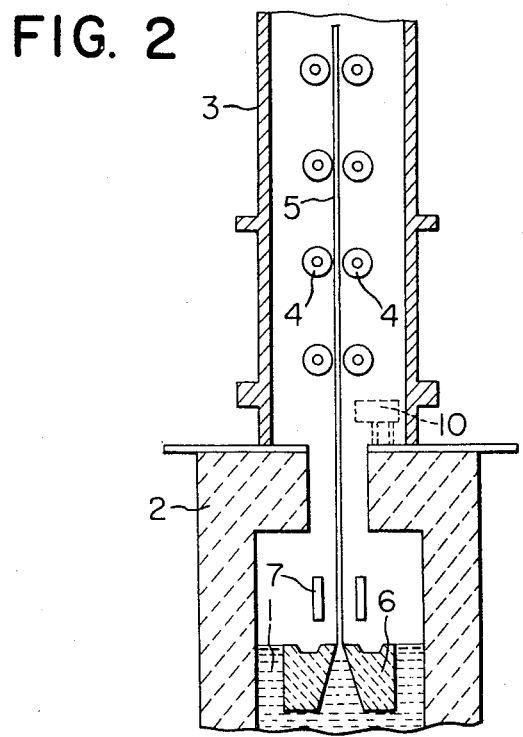
FIG. 2 is a cross-sectional view taken along line X—X of FIG. 1.

FIGS. 1 and 2 show an apparatus for manufacturing sheet glass utilizing the vertical take-up system where molten glass material 1 is introduced into the system from a melting furnace into a pit 2. Over pit 2 is a drawing tower 3 provided with a number of paired take-up rolls 4. Between paired rolls 4 a molded glass sheet 5 advances upwardly as it is taken up from the pit 2 after passing through a drawing block 6 and cooler 7. With this type of system the molten glass 1 is subject to containing a high level of impurities. Fissures or cracks are produced at locations in sheet 5 where these impurities are present when the sheet glass passes between the rolls 4.

In accordance with the present invention, to detect these impurities, drawing tower 3 is provided with a defect detection apparatus. The detection apparatus comprises a laser light generator 10 and a laser detector 20. Generator 10 and detector 20 are positioned below the first paired take-up rolls 4 and are positioned with respect to glass sheet 5 so that laser beams pass through the glass sheet 5. To enable the laser beam to pass through tower 3 and reach detector 20, tower 3 is provided with windows W1, W2 (FIG. 3).

Figure 3:
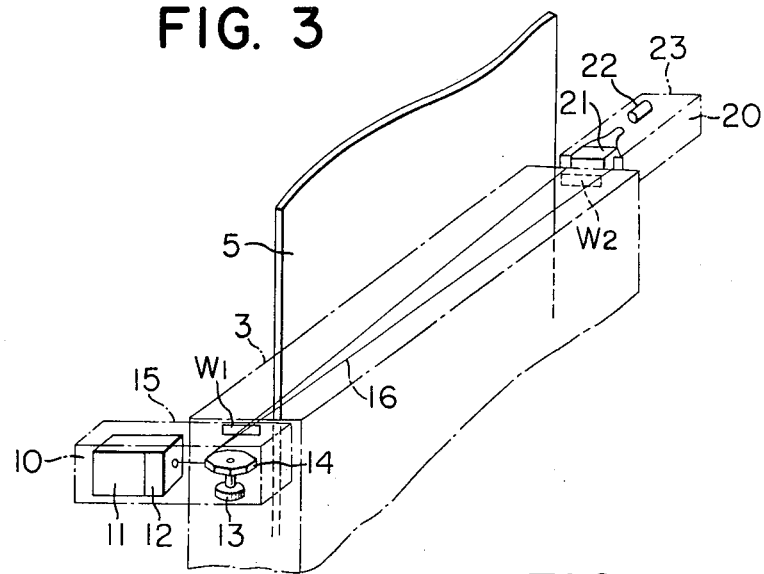
FIG. 3 is a perspective view of the detection apparatus of the present invention.
Figure 4:
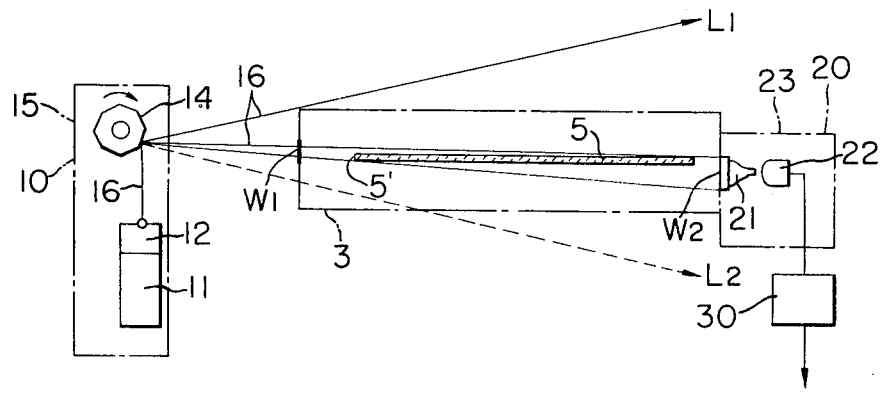
FIG. 4 is a diagrammatic view illustrating the operation of the apparatus of FIG. 3.

As shown in FIGS. 3 and 4, the laser generator 10 is arranged at one side 5' of the glass sheet 5. The generator 10 consists of a laser oscillator 11, a group of converging lenses 12 and a polyhedral rotary mirror 14 rotatable at a fixed speed by a motor 13. The components of generator 10 are contained within a housing 15. The laser oscillators which may be utilized in practicing the invention are gas lasers, liquid lasers, crystal lasers, glass lasers and semi-conductor lasers. In the preferred embodiment of the invention, laser oscillator 11 is a He-Ne gas laser oscillator which generates laser energy at a wavelength of 6328 A.

The relation of the polyhedral rotary mirror 14 to laser beam 16 is shown in FIG. 4. The diameter of beam 16 is extremely narrow, for instance, approximately 1 to 2 mm. When the laser beam strikes one mirror face of the polyhedral rotary mirror 14 while rotating in the direction of arrow, it is initially reflected in the direction of arrow $L_1$. As the mirror rotates, laser beam 16 is reflected through the glass sheet 5, until the reflected beam reaches a position indicated by arrow $L_2$. Thereafter the beam 16 strikes the next mirror face on the polyhedral rotary mirror 14, which enables repetition of the scanning pattern toward position $L_2$ from position $L_1$. Thus, the rotation of the polyhedral rotary mirror 14 causes beam 16 to repeatedly scan over the glass sheet 5 from an oblique direction.

The laser detector 20 includes a light converger 21, a photoelectric converter 22 for generating an electric signal in response to the amount of incident light, and a housing 23 for the converger and converter. In the preferred embodiment, the light converger 21 is a flexible bundle of glass optical fibers (commonly referred to in the art as flexible fiber optics). The end surface of the fiber optics is in a rectangular shape and forms a light receiving surface for the laser beam 16. The other end surface of the fiber optics bundle is in a circular shape and contacts a light receiving window in the photoelectric converter.

Output of the converter 22, which in the preferred embodiment is a photoelectron multiplier, is supplied to a detection circuit 30. The operation of detection circuit 30 is described below.

The method of detection according to the present invention is illustrated with reference to FIG. 4 where the laser beam 16 repeatedly and unidirectionally moves between positions $L_1$ and $L_2$ in the manner described above, with the portion of beam 16 which covers the entire surface of sheet glass 5 falling upon the laser light detector 20. If defects or irregularities are not present in the glass sheet 5, a major portion of the energy in the beams 16 will strike the laser light detector 20, while a minor portion of the energy in the beams will be reflected from the surface of the sheet glass or will be attenuated during their passage through the interior of the sheet glass. Accordingly, a voltage or other electrical signal of a magnitude indicative of the amount of incident light is obtained from the laser light detector 20. However, if defects or irregularities are present in the glass sheet 5, such defects will disperse the beams 16, or absorb and obstruct the passage of the beams, so that the expected amount of light incident on the detector 20 suddenly decreases. As a result, the electric signal output of detector 20 will decrease abruptly in response to the decrease of the incident light. Variations of this output are analyzed to determine the presence or absence of defects and irregularities.

Figure 5:
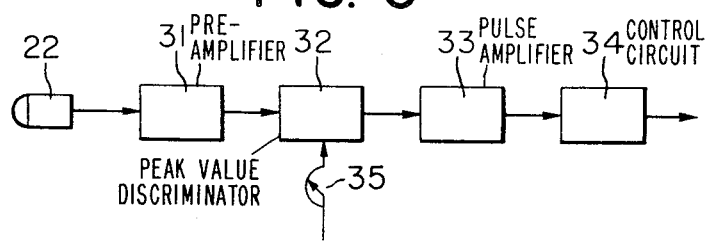
FIG. 5 is a block diagram schematically showing a detection circuit of the invention.

One embodiment of the detection circuit 30 is shown in FIG. 5. The output of the photoelectric converter 22 is amplified by a pre-amplifier 31 and then passed to a peak value discriminator circuit 32, frequently referred to in the art as a threshold detector. A variable resistor 35 connected to circuit 32 establishes a predetermined voltage level with which the output of the pre-amplifier 31 is compared. When the output of the pre-amplifier 31 decreases below the predetermined voltage level, a pulse appears at the output of the discriminator 32. The output of the discriminator 32 is sampled during each scan period by means of a two-input AND gate (not shown), or the logic equivalent thereto. One input to the AND gate is in the output of the discriminator 32 while the other input to the AND gate is connected to a reference signal source (not shown) synchronized with the scanning of beam 16 by rotary mirror 14 (FIG. 4). The AND gate thus inhibits or blocks the output of the discriminator 32 between scans of the glass sheet 16. Pulses which appear at the output of the AND gate are amplified by a pulse amplifier circuit 33 and then passed to an output control circuit 34. For example, the output control circuit 34 may include a monostable circuit which outputs an alarm or control signal, termed a defect signal, for a predetermined period of time to alert the operator to the presence of defects or irregularities in the glass sheet 5.

Figure 6:
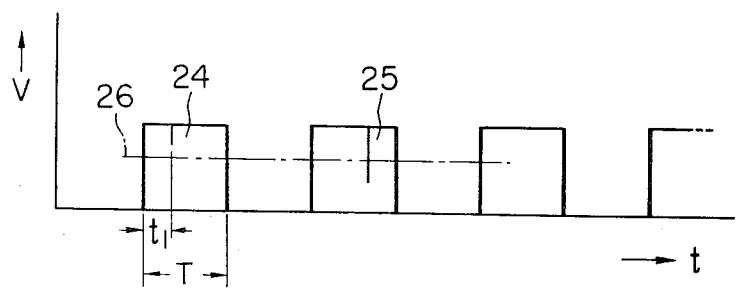
FIG. 6 is a diagrammatic representation showing the waveforms of an output voltage for a laser detector used in the detection system.

Waveforms of the output of the laser detector 20 are shown in FIG. 6. In the diagram, the abscissa indicates time $t$ and the ordinate the output voltage $v$ of the photoelectric converter 22. The output voltage is approximately rectangular if defects or irregularities are not present. In the absence of defects, the output voltage is continuously high during the scan period T. In the time interval between successive scans the output of the converter 22 is continuously low. During the scan periods, if defects are present, the output reduces abruptly when the beam 16 strikes the defective area, producing negative going voltage spikes as shown at 24 and 25. By detecting these rapid decreases of output voltage during a scan period, it is possible to discriminate between the presence and absence of defects or irregularities in the glass sheet 5. The magnitude of the voltage variation at 24 or 25, for example, is proportional to the dimensions of the defects or irregularities. Dashed line 26 of FIG. 6 represents the discriminator voltage level predetermined by setting the variable resistor 35 (FIG. 5). By changing the set value of the variable resistor 35 and thereby adjusting the predetermined level 26, it is possible to achieve optimum sensitivity of the detection circuit 30 with respect to the dimensions of the defects to be detected. Thus, for example, if the predetermined level 26 is determined as shown in FIG. 6, the defect represented by spike 24 will not be detected, but the defect at 25 will be detected. Thus, during the second scan period, as shown in FIG. 6, the discriminator 32 would produce an output pulse which would be gated thorugh the AND gate and amplified in pulse amplifier 33 to trigger the output control circuit 34.

In the embodiment described above, the amount of light incident on the light converger 21 is represented as one block or unit per scan period and the variation within the whole unit is detected; that is to say, a single pluse is obtained for one scan period and defects are detected by the variation from the peak or normal high value of the pulse voltage. If the light converger 21 is divided by optical construction into a cellular form (not shown), during one scan period a sequence of pulses can be obtained corresponding to the divisions or cells in the light receiving end of the converger 21. Accordingly, it is possible to detect the position and dimensions of defects by nothing in which cell a particular voltage variation occurred. Alternatively, the converger 21 may be replaced by an array of photoelectric converters 22 (not shown) arranged such that the beams 16 consecutively enter the converters. The position of defects is similarly determined when using the described alternative method.

To insure that all of the surface of the glass sheet 5 is scanned without exception, the relationship between the take-up speed of the glass sheet 5, the rotational speed of the mirror 14 and the number of mirror faces on the mirror 14 may be determined so as to satisfy the following formula:

$$n \cdot N \text{ thus } .b \quad a,$$

where $n$ represents the number of faces on the rotary mirror 14, $N$ represents the r.p.m. of the mirror motor 13, $b$ represents the diameter (mm) of beam 16, and $a$ represents the take-up speed (mm per minute) of the glass sheet 5.

It is also possible to determine the location of the defects by using the defect signal issued from the detection circuit 30. This can be accomplished by noting the relation of the time $t_1$ (FIG. 6) of the defect signal relative to the scan period T. For example, if the defect signal occurred half-way through the scan period T, the defect would be known to be located in the middle of the glass sheet on the path through which the beam 16 had just been swept.

To produce the scanning of the laser beam, the rotary mirror 14 may be replaced by a single mirror oscillating back and forth at a predetermined constant frequency.

The embodiment as hereinbefore described shows an example in which the invention is applied to apparatus for manufacturing sheet glass according to the vertical take-up system. The invention, however, is not confined to this case but is applicable likewise to apparatus for manufacturing sheet glass in which the glass is taken out in the horizontal direction, or similarly to apparatus in which the sheet glass product is inspected while it is transferred to another location, by a system allowing the detection of defects and irregularities continuously as in the preceding cases. It will be noted that the present invention can be utilized for the detection of bubbles, surface scars and cuts in addition to the above mentioned defects and irregularities such as pebbles and brick pieces. To sum up, the invention can be extensively utilized to detect the presence in glass of anything which may affect the amount of light incident on the light receiving means.

Figure 7:
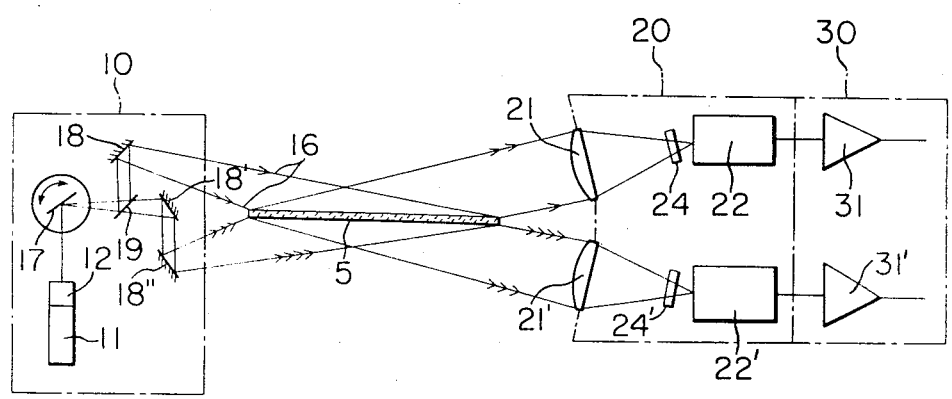
FIG. 7 is a diagrammatic view showing an alternate embodiment of the detection apparatus of the present invention.

It is, of course, possible to detect defects and irregularities present only on the surface of the sheet glass by using the light which is reflected from the glass rather than the light transmitted therethrough. This is accomplished by relocating the light receiving means such that only laser light reflected from the surface is received. FIG. 7 is an example showing the above mentioned case. The laser beam 16 produced by the laser oscillator 11 is reflected by the oscillating or vibrating mirror 17, and the reflected light is split into two directions by a semi-reflective mirror or beam splitter 19. The light is projected in one direction onto one side of the glass sheet 5 by a fixed mirror 18. The light from mirror 18 is reflected from the surface of the glass sheet and enters a light converging means 21, or a light converging lens, oriented obliquely with respect to the plane of the sheet 5. The light beams which are passed in the other direction by the beam splitter 19 are projected onto the other side of the glass sheet 5 by a pair of fixed mirrors 18' and 18''. The light beams from mirror 18'' reflected from the glass sheet 5 are received by another light converging lens 21', oriented similarly to lens 21. The optical light transmitting axes of mirror 18 and mirror pair 18', 18'' are oriented so that light transmitted through the glass sheet from either side will not fall on either lens 21 or 21'. The light beams reflected from the opposite sides of sheet 5 pass through light filters 24 and 24' and are converted into electric signals by the photoelectric multipliers 22 and 22' respectively. The output of each multiplier is passed to a respective detection circuit 31 or 31', each of which may comprise the same components as shown in FIG. 5 for circuit 30. The aforementioned light receiving means may preferably use fiber optics as described above as an alternative for the converging lens system. In such case, the light converging means consisting of glass optical fibers has the advantage of simpler adaptation to the light receiving means since the end of the fiber optical element can assume the desired shape of the light receiving surface and lead the light to a light receiving window of the photoelectric converter, thus avoiding the need for precise alignment of the optical axis of the converging lenses 21 and 21' shown in FIG. 7. In the case of the reflection system of FIG. 7, the object is to detect protruding parts and like elevations on the surface of the glass sheet. The system of FIG. 7 is more complicated than the basic system of FIG. 4 since in the former case two separate optical systems must be provided for inspecting both surfaces of the sheet glass. Since the apparatus of the reflection system of FIG. 7 detects only surface irregularities, it is more advantageous for the detection and prevention of cracks of fissures produced during manufacture.

Generally, the longitudinal side edges of the glass sheet drawn from the melting furnace have irregular shapes. Therefore, it may be critical in some applications to project the laser beams obliquely to the surface of the glass sheet in a preferred or acute angle as in the above embodiment. The laser beams, thus entering the surface of the glass sheet and not entering the side edges of the sheet, assure the correct detection of defects; and irregular forms or shapes of the side edges of the glass sheet will not adversely affect the detection results. The angle of incidence can be controlled by changing the location of the light projecting means. By changing the swing angle of the laser beams or the width of scanning, defects can be detected in a desired isolated portion of the surface of the glass sheet.

When using the above described polyhedral rotary mirror, the width of the laser beams may be increased or decreased by changing the number of mirrors, and the speed of rotation of the mirror may also be changed to alter the scan period. If an oscillating or vibrating mirror is used, as in the embodiment shown in FIG. 7, the angle through which the mirror is turned or the frequency of oscillation of the mirror may be varied so as to adjust the accuracy of detection.

Further modifications can be made in the arrangements described without departing from the scope of the invention.

I claim:

1. Apparatus for detecting irregularities contained in glass sheet, comprising laser beam projecting means mounted adjacent to and substantially aligned with one longitudinal edge of said glass sheet for directing a laser beam transversely across a longitudinally moving elongated sheet of glass from a point beyond one longitudinal edge of said sheet in the direction of the width of said sheet, means for periodically oscillating said beam about said point in an acute arc to scan the whole width of said sheet, said beam intersecting said sheet at an acute angle over the whole width of said sheet as it moves from one edge of the sheet to the other, receiving means fixedly positioned alongside the opposite longitudinal edge of said sheet for receiving a portion of said beam from said sheet during said scanning to generate a signal corresponding to the intensity of said beam and detection circuit means connected to receive said receiving means output signal for detecting variations in the amplitude thereof with respect to a predetermined level during each said scan and for issuing a defect signal indicative of said variations.

2. The apparatus of claim 1, wherein the point from which said beam is directed across such sheet is spaced from the plane of said sheet such that said beam is projected during scanning in a direction nearly parallel to the width of said sheet.

3. The apparatus of claim 2, wherein said beam intersects said sheet at approximately the same acute angle over the whole width of said sheet.

4. The detecting apparatus according to claim 1, wherein said laser beam projecting means includes a laser oscillator for generating a laser beam and at least one oscillating mirror operatively aligned with said laser oscillator for deflecting said laser toward said sheet.

5. The detecting apparatus according to claim 1, wherein said laser beam projecting means includes a laser oscillator for generating a laser beam and a polyhedral rotary mirror mounted for rotation to deflect said laser beam toward said sheet.

6. The detecting apparatus according to claim 1, wherein said laser projecting means is spaced obliquely from said one edge of said sheet such that during said scanning said beam is incident on said sheet at an acute angle to the surface thereof.

7. The detecting apparatus according to claim 1, wherein said light beam receiving means includes a fiber optic element and a photoelectric converter for receiving the light from said beam conducted by said fiber optic element.

8. The apparatus of claim 7, wherein said fiber-optic element has a receiving end which is disposed adjacent to said opposite edge to subtend the arc swept out by said beam during scanning of said sheet.

9. The apparatus of claim 8, wherein the length of said receiving end is substantially less than the width of said sheet.

10. The detecting apparatus according to claim 1, wherein said detection circuit means includes a discriminator circuit operatively receiving the output of said light receiving means for comparison thereof with a predetermined signal level, said discriminator circuit generating an output pulse when said predetermined signal level exceeds said light receiving means output during each said scan, and an output circuit connected to be energized by said discriminator circuit output pulse for generating a defect signal for a predetermined period of time.

11. Apparatus for detecting defects and irregularities contained in glass sheet drawn from a melting furnace and transferred via at least one pair of opposing take-up rolls, comprising laser beam projecting means mounted adjacent to one longitudinal edge of said glass sheet between said melting furnace and a first pair of said take-up rolls for projecting a laser beam into the surface of said sheet during transfer thereof and repeatedly scanning said beam across the surface of said sheet, laser beam receiving means operatively mounted adjacent the other longitudinal edge of said sheet between said melting furnace and said first pair of take-up rolls to receive a portion of the light in said beam from said sheet surface during said scanning for generating a signal corresponding to the intensity of the light thus received, and a detection circuit operatively connected to said receiving means for detecting variations of the amplitude of said receiving means output signal and for issuing a defect signal indicative of said variations.

12. The apparatus of claim 11, wherein said beam projecting means includes means for directing said beam transversely across said sheet from a point beyond said one edge in the direction of the width of said sheet and spaced from the plane of said sheet such that said beam is projected during scanning in a direction nearly parallel to the width of said sheet.

13. The apparatus of claim 11, wherein said receiving means is stationary.

14. The apparatus of claim 11, wherein said receiving means includes a fiber-optic element having a receiving end fixedly positioned to subtend the arc swept out by said beam during scanning and a photoelectric converter for receiving the light from said beam conducted by said fiber-optic element.

15. The apparatus of claim 14, wherein the length of said receiving end of said fiber-optic element is substantially less than the width of said sheet.

16. A method of automatically detecting defects and irregularities contained in glass sheet, comprising the steps of directing a laser beam transversely across a longitudinally moving elongated sheet of glass from a point substantially aligned with and beyond one longitudinal edge of said sheet in the direction of the width of said sheet, periodically oscillating said beam about said point in an acute arc to scan the whole width of said sheet, said beam intersecting said sheet at an acute angle over the whole width of said sheet as it moves from one edge of the sheet to the other, receiving at a stationary location along the opposite edge of said sheet a portion of said laser beam from said sheet during said scanning, and continuously detecting the presence and absence of irregularities in said sheet from variations of intensity of the received beam.

17. The method of claim 16, wherein said beam is projected across said sheet in a direction nearly parallel to the width of said sheet.

18. The method of claim 17, wherein said beam intersects said sheet at approximately the same acute angle over the whole width of said sheet.

19. The method of claim 16, wherein the step of receiving a portion of said beam from said sheet includes receiving the portion of said beam transmitted through said sheet during scanning.

20. The method of claim 16, wherein the step of receiving the portion of said beam from said sheet includes receiving the portion of said beam reflected from the surface of said sheet during said scanning.

21. The method of claim 16, further comprising the step of detecting the time within each scanning period at which said variations occur.

22. The method of claim 16, wherein said point is spaced from the plane of said sheet such that said beam is projected in a direction nearly parallel to the width of said sheet during scanning.

* * * * *

UNITED STATES PATENT OFFICE
CERTIFICATE OF CORRECTION

Patent No. 3,737,665  Dated June 5, 1973

Inventor(s) Yasuyuki Nagae

It is certified that error appears in the above-identified patent and that said Letters Patent are hereby corrected as shown below:

Column 1, line 23, "presecne" should read --presence--.
Column 2, line 9, "of sheet without" should read --of sheet glass without--.

Column 3, line 60, "electrical" should read --electric--.
Column 4, line 17, "gate is in the" should read --gate is the--.
Column 4, line 61, "thorugh" should read --through--.
The formula appearing after line 21 in Column 5, "n·N thus .b  a," should read --$n \cdot N \cdot b \geq a$,--.
Column 5, line 26, "a" should be italicized.

Signed and sealed this 12th day of February 1974.

(SEAL)
Attest:

EDWARD M. FLETCHER, JR.  C. MARSHALL DANN
Attesting Officer  Commissioner of Patents